United States Patent
Wang et al.

(10) Patent No.: US 11,570,213 B2
(45) Date of Patent: Jan. 31, 2023

(54) COLLABORATIVE SECURITY FOR APPLICATION LAYER ENCRYPTION

(71) Applicant: Cisco Technology, Inc., San Jose, CA (US)

(72) Inventors: Jianxin Wang, Saratoga, CA (US); Nancy Cam-Winget, Mountain View, CA (US); Donovan O'Hara, Acton, MA (US); Richard Lee Barnes, II, Arlington, VA (US)

(73) Assignee: Cisco Technology, Inc., San Jose, CA (US)

( * ) Notice: Subject to any disclaimer, the term of this patent is extended or adjusted under 35 U.S.C. 154(b) by 420 days.

(21) Appl. No.: 16/788,999

(22) Filed: Feb. 12, 2020

(65) Prior Publication Data

US 2020/0322382 A1   Oct. 8, 2020

Related U.S. Application Data

(60) Provisional application No. 62/828,939, filed on Apr. 3, 2019.

(51) Int. Cl.
*H04L 9/40* (2022.01)

(52) U.S. Cl.
CPC ........ *H04L 63/166* (2013.01); *H04L 63/0281* (2013.01); *H04L 63/0428* (2013.01); *H04L 63/061* (2013.01); *H04L 63/0807* (2013.01); *H04L 63/12* (2013.01); *H04L 63/1408* (2013.01); *H04L 63/1433* (2013.01)

(58) Field of Classification Search
CPC ............... H04L 63/166; H04L 63/0281; H04L 63/0428; H04L 63/061; H04L 63/0807; H04L 63/12; H04L 63/1408; H04L 63/1433; H04L 63/0464; H04L 63/0272; H04L 63/205
See application file for complete search history.

(56) References Cited

U.S. PATENT DOCUMENTS

| | | | |
|---|---|---|---|
| 7,194,759 B1 * | 3/2007 | Chess | H04L 9/3263 709/203 |
| 8,380,847 B2 * | 2/2013 | Aaron | H04L 63/1408 709/224 |

(Continued)

FOREIGN PATENT DOCUMENTS

| | | | | |
|---|---|---|---|---|
| WO | WO-2007001941 A2 * | 1/2007 | | G06F 8/67 |
| WO | WO-2009109811 A1 * | 9/2009 | | G06F 21/57 |

(Continued)

*Primary Examiner* — Sarah Su
(74) *Attorney, Agent, or Firm* — Polsinelli

(57) ABSTRACT

A non-transitory computer readable medium comprising instructions stored thereon, the instructions effective to cause at least one processor to: establish trustworthiness of an application installed on a endpoint, the established trustworthiness is sufficient for an enterprise security infrastructure to treat the application installed on the endpoint and the endpoint as a trusted application and a trusted endpoint; negotiate with the trusted endpoint to determine a traffic inspection method for traffic flows originating at the trusted application that is destined for a service, the traffic inspection method is determined based on at least the trusted application, and the service; and instruct the trusted application of the determined traffic inspection method.

20 Claims, 7 Drawing Sheets

(56) References Cited

U.S. PATENT DOCUMENTS

| | | | | |
|---|---|---|---|---|
| 8,745,616 | B1* | 6/2014 | Deacon | H04L 63/12 |
| | | | | 717/177 |
| 8,909,928 | B2* | 12/2014 | Ahmad | H04L 9/0897 |
| | | | | 713/168 |
| 8,972,726 | B1* | 3/2015 | Poling | H04L 63/0428 |
| | | | | 713/168 |
| 10,404,733 | B1* | 9/2019 | Shavell | H04L 63/1433 |
| 10,805,320 | B1* | 10/2020 | Wang | H04L 63/0245 |
| 2012/0192249 | A1* | 7/2012 | Raleigh | H04W 28/0215 |
| | | | | 370/235 |
| 2015/0180894 | A1* | 6/2015 | Sadovsky | H04W 12/12 |
| | | | | 726/22 |
| 2016/0036826 | A1* | 2/2016 | Pogorelik | H04L 63/20 |
| | | | | 726/1 |
| 2017/0289197 | A1* | 10/2017 | Mandyam | H04L 63/166 |
| 2017/0302449 | A1* | 10/2017 | Wagner | H04L 63/061 |
| 2019/0109866 | A1* | 4/2019 | Lokamathe | H04L 9/3239 |
| 2019/0166160 | A1* | 5/2019 | Syvänne | H04L 63/0227 |
| 2020/0142986 | A1* | 5/2020 | Ragnoli | H04L 9/0894 |
| 2020/0320199 | A1* | 10/2020 | Sheth | H04L 63/0823 |
| 2020/0322145 | A1* | 10/2020 | Sheth | H04L 63/0869 |
| 2021/0075799 | A1* | 3/2021 | Pularikkal | G06F 21/52 |

FOREIGN PATENT DOCUMENTS

| | | | | |
|---|---|---|---|---|
| WO | WO-2013034187 A1 * | 3/2013 | | H04L 63/061 |
| WO | WO-2021029919 A1 * | 2/2021 | | G06F 21/52 |

* cited by examiner

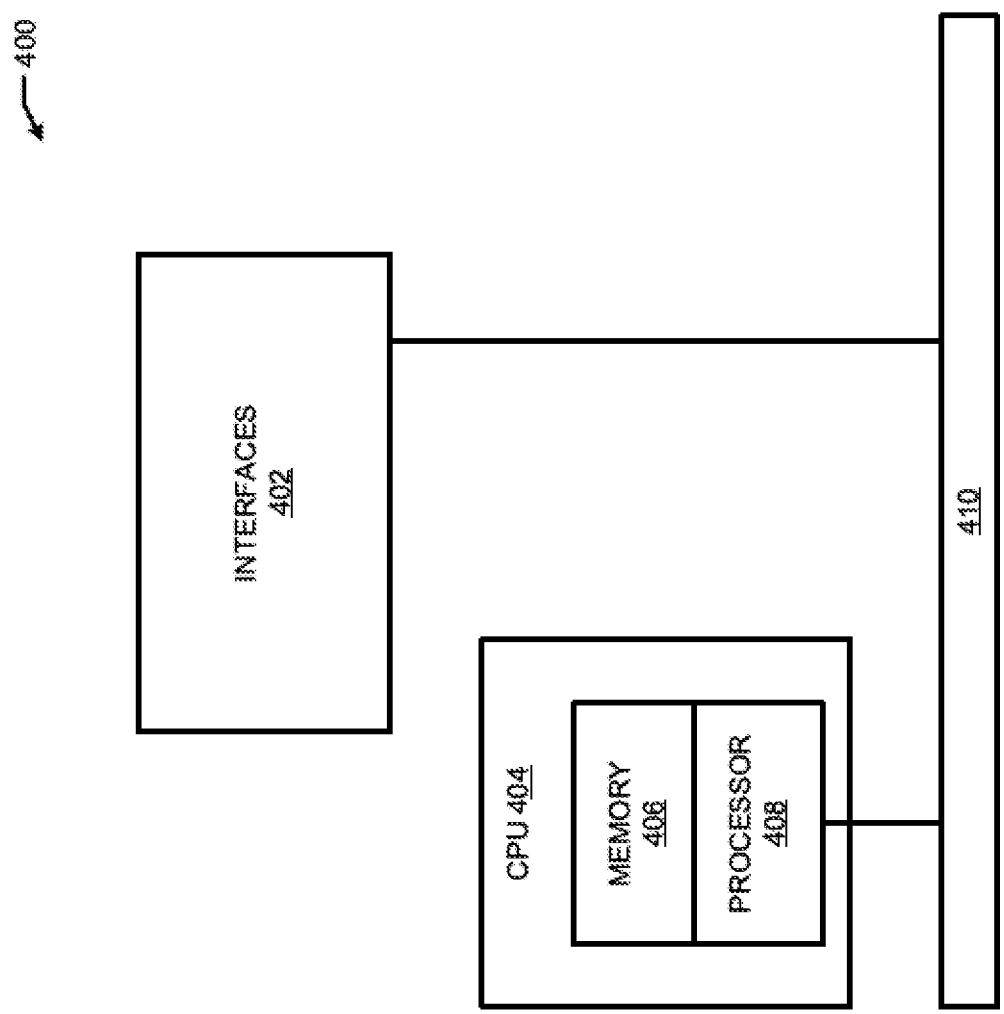

COLLABORATIVE SECURITY FOR APPLICATION LAYER ENCRYPTION

CROSS-REFERENCE TO RELATED APPLICATIONS

This application claims priority to U.S. Provisional Application No. 62/828,939, filed on Apr. 3, 2019, entitled "Collaborative Security for Application Layer Encryption," the content of which is incorporated herein by reference in its entirety.

TECHNICAL FIELD

The present invention generally relates to network security. In particular, the present invention relates to security for encrypted application layer traffic.

BACKGROUND

Network traffic data flows are often encrypted and, as a result, network traffic contents (e.g., data content of flows) may be obfuscated from direct review. In some cases, network traffic can be decrypted or directly inspected to some degree; however, direct inspection necessitates accessing potentially confidential information and/or slowing down traffic flows due to inspection processing. Further, application layer traffic may be encrypted with application specific trust stores and/or custom secure sockets layer (SSL) stacks. As a result, the network security infrastructures such as interim proxies, sometimes called man-in-the-middle (MITM) proxies, private certification authorization (CA) protocols, and other data flow inspection processes and devices may fail to verify network traffic at the application layer, and thus provide inferior security functions. Moreover, the popular way of intercepting traffic flow and then decrypting and inspecting it would be less practical, and it would break up and slow down the traffic flow.

BRIEF DESCRIPTION OF THE FIGURES

To provide a more complete understanding of the present disclosure and features and advantages thereof, reference is made to the following description, taken in conjunction with the accompanying drawings, in which:

FIG. 4 illustrates an example endpoint, according to various embodiments of the subject technology.

DETAILED DESCRIPTION

Figure 1:
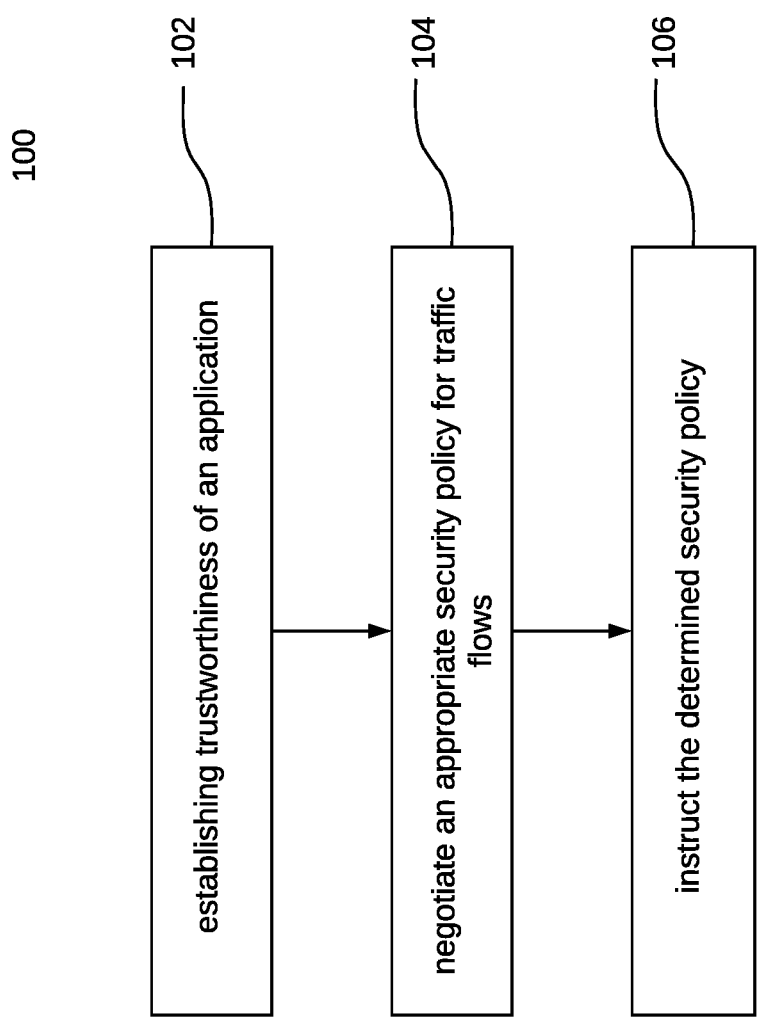
FIG. 1 illustrates an example method embodiment for collaborative security for application layer encryption in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

An approach to security at the application layer based on established trustworthiness (e.g., of the device, the application or web browser layer) may avoid directly reviewing contents of network traffic and so avoid impacting application security and/or slowing down network traffic flows. Establishing trustworthiness between any physical or virtual devices, applications stored on the devices, and the browsers installed on the devices (or any combination thereof) in an underlying network infrastructure may be based on trust anchors (e.g., trusted platform module (TPM), trusted execution environments, or anti-counterfeiting technology (ACT2)) associated with entities on either or both ends of an application layer data flow. As a result, application layer security can be provided without, or with minimal need of inspection of application functions and/or behaviors over the network.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology acknowledges difficulties associated with inspecting network traffic data flows, especially encrypted data flows.

Network traffic data flows are often encrypted and, as a result, network traffic contents (e.g., data content of flows) may be obfuscated from direct review. In some cases, network traffic can be decrypted or directly inspected to some degree; however, direct inspection necessitates accessing potentially confidential information and/or slowing down traffic flows due to inspection processing. Further, application layer traffic may be encrypted with application specific trust stores and/or custom secure sockets layer (SSL) stacks. As a result, the network security infrastructures such as interim proxies, sometimes called man-in-the-middle (MITM) proxies, private certification authorization (CA) protocols, and other data flow inspection processes and devices may fail to verify network traffic at the application layer, and thus provide inferior security functions. Moreover, the popular way of intercepting traffic flow and then decrypting and inspecting it would be less practical, and it would break up and slow down the traffic flow.

Accordingly, the present technology provides techniques that can alleviate some of the above concerns. Specifically, the present technology can take advantage of techniques that allow network security infrastructure to trust that devices and applications stored thereon. Once network infrastructure can trust devices and applications, network security can utilize the endpoint and its applications in a collaborative manner to help the network infrastructure to process traffic efficiently while still enforcing network policies.

In some embodiments, the present technology can determine that a device and an application stored thereon is trustworthy, and then negotiate with the device and application to determine the proper policies to be invoked by the network infrastructure, a method of traffic inspection, or decide no inspection is required. When some amount of inspection is required, the device and its application can aid the network infrastructure in efficiently inspecting traffic flows.

FIG. 1 illustrates an example method of collaborative security for application layer encryption (100). The application installed on an endpoint establishes its trustworthiness to an enterprise security infrastructure (102). Such established trustworthiness is sufficient for the enterprise security infrastructure to treat the application installed on the endpoint and the endpoint as a trusted application and a trusted endpoint. This enterprise security infrastructure can be, but is not limited to, Local Area Network (LAN) based network infrastructure, or cloud delivered network infrastructure. The endpoint can be, but is not limited to, a switch, a router, a gateway, a personal computing device, a smart phone, and Internet of Things (IOT) device, or an endpoint. As addressed below, there are different ways to establish the trustworthiness of the application, such as receiving attestation, or utilizing Canary Stamp, etc.

The enterprise security infrastructure can then negotiate with the trusted endpoint to determine an appropriate security policy for traffic flows (104). The traffic flows are originated at the trusted application and are destined for a service. The service includes a transmission of data over the network between the application and services on a server. In some embodiments, the security policy includes traffic inspection methods. The traffic inspection method can be determined based on at least the trusted application, and the data that is being transferred, and the service. In some embodiments, the negotiation is conducted between a Transport Layer Security (TLS) proxy of the enterprise security infrastructure and the trusted endpoint, and the Transport Layer Security (TLS) proxy can determine the traffic inspection method. In some embodiments, the negotiation can be an actual extension in the Transport Layer Security (TLS) communication. Such an extension is further protected by encryption established during the assertion of trustworthiness.

The traffic inspection method can include, but is not limited to, a trusted path traffic inspection method, a Metadata policy query traffic inspection method, or an authorized proxy negotiation traffic inspection method. These traffic inspection methods are addressed in greater detail below with respect to FIG. 3A. FIG. 3B, and FIG. 3C.

The determined traffic inspection method is applicable for a single session of data transfer. Each determined traffic inspection method must be re-determined after the end of a session represented with certain events, for example, a transmission of a certain amount of data. Thus, after establishing trustworthiness of the application first (102), the application and the enterprise security infrastructure will repeat the determination and negotiation of traffic inspection method (104) before each session.

After determining the type of appropriate security policy for each session, the trusted application instructs the enterprise security infrastructure of the determined security policy (106). The security policy can include traffic inspection methods. After the instruction, the application will transmit the traffic flow according to the determined traffic inspection method. In some embodiments, the enterprise security infrastructure can apply the determined traffic inspection method to the traffic of the trusted application. In some embodiments, the enterprise security infrastructure can also refuse to apply the determined traffic inspection method based on its own security policy. Such security policy of the enterprise security infrastructure can include a policy that instructs the enterprise security infrastructure to inspect all traffic no matter the instruction from the trusted application.

Figure 2:
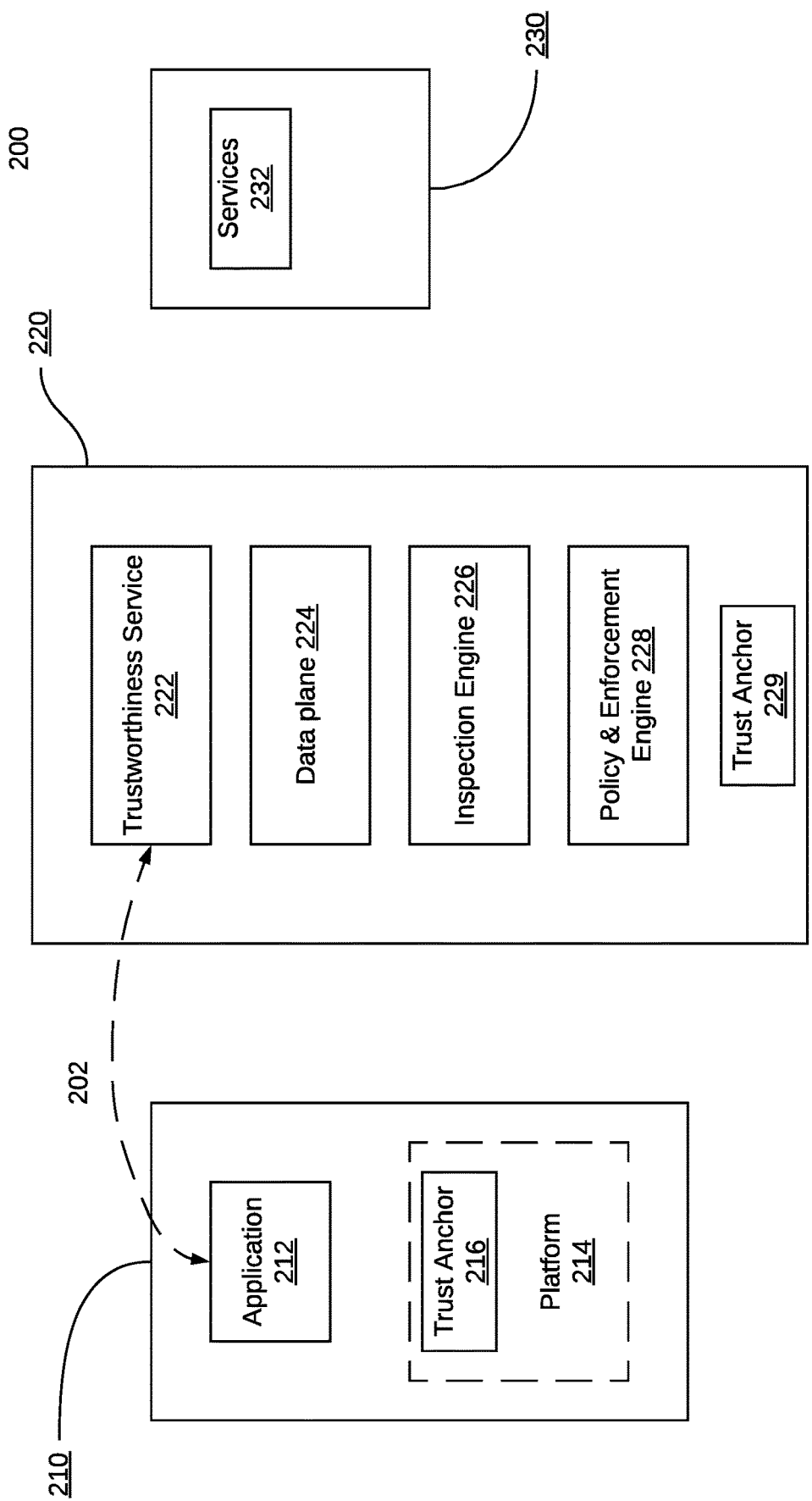
FIG. 2 illustrates an example system embodiment for implementing collaborative security for application layer encryption traffic utilizing attestation in accordance with some aspects of the present technology.

FIG. 2 illustrates an example system of implementing the collaborative security for application layer encryption utilizing attestation (200). The example system includes an endpoint 210, an enterprise security infrastructure 220, and a server 230. The endpoint 210 includes application 212, a platform 214, and a trust anchor 216. One or more applications 212 can be installed on the endpoint 210. The trust anchor 216 can be embedded in the platform 214.

The enterprise security infrastructure 220 includes a trustworthiness service 222, a data plane 224, a data inspection engine 226, a policy and enforcement engine 228, and a trust anchor 229.

The server 230 can provide one or more services 232. The trustworthiness service 222 can include an identity engine.

The trust anchors 216 and 229 can be cloud platform based, such as a secure storage over the cloud, or hardware based, such as a Trusted Platform Module (TPM), or a Trust Anchor Module (TAM). Each of the data plane 224 and the data inspection engine 226 can further include a packet path to transfer data from the application 212 to the services 232 on the server 230.

As addressed above, the present technology can rely upon the enterprise security infrastructure 220 collaborating with the trusted endpoint 210 and/or the trusted application 212 to determine appropriate treatment of application flows. The enterprise security infrastructure 220 can gain trust in the trusted endpoint 210 and/or the trusted application 212 using one of several techniques.

New technologies provide capabilities which support the secure, real-time reporting of active trustworthiness measurements/evaluation from an endpoint. Specifically, all-in-one chips have been used to implement secure boot modules, trust anchor modules, and secure Joint Test Action Group (JTAG) solutions for verifying the trustworthiness of devices. Further, tokens or metadata elements containing security measurements or security evidence have been developed for verifying the trustworthiness of devices.

Some security approaches can require explicit verifications of trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets.

In some cases, a Hardware Security Module (HSM) or Trusted Execution Environment (TEE) can be implemented to collect and attest the identity of hardware and software components in a platform to establish trust for that platform. In some embodiments, the Hardware Security Module (HSM) can be a Trusted Platform Module (TPM). A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated crypto processors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

Using, for example, one of the techniques described above, network security infrastructure 220 can trust endpoint 210 and application 212. While several techniques were discussed above, the present technology should not be limited to such technologies. Likewise, in the description that follows, the present technology is primary discussed with respect to attestation, but the present technology should not be considered limited to attestation to establish trust with endpoint 210 and application 212.

FIG. 2 illustrates an attestation path 202 that can provide an application layer attestation to a trustworthiness service 222 over a direct channel to show that a respective application 212 on an endpoint 210 has a correct posture. The attestation can be done by binding a root of trust for the endpoint 210 and a signing voucher for the application 212 together into a single attestation. The trustworthiness service 222 can provide the attestation to the enterprise security infrastructure 220 for downstream processing such as determining access control privileges at various locations within the network, routing flows either partially or totally through or in avoidance of particular regions or equipment.

In some examples, attestation procedures for determining an application posture may include enforcement processes integrated into or in communication with the application 212. The enforcement processes may exchange with a security agent and/or a trust anchor 216 installed on the endpoint 210 using standard attestation procedures.

In other examples, such as in the case of the trusted path traffic inspection method that will be described below, the application 212 may provide the attestation embedded into a transport layer security (TLS) protocol in parallel to, or part of, the traffic flows through a respective data plane, such as data plane 224. In effect, the attestation is directly incorporated into the transport layer security (TLS) negotiation with the enterprise security infrastructure 220, which may then choose to trust the flow or perform downstream processes in response to the incorporated attestation.

In some embodiments, once the attestation is achieved, the network security infrastructure 220 can identify or tag the corresponding application 212 on the endpoint 210 as trustworthy. Such an assertion include the identification or tag can be shared across the network infrastructure, including the Transport Layer Security (TLS) proxy of the enterprise security infrastructure. With such an assertion, the network infrastructure can also provision the endpoint or the application with the appropriate information, including providing an authorization token, so that the application can utilize the authorization token when it wants to communicate through the network infrastructure. Such a provisioning process and the validation of the authorization token is stateless, as the network infrastructure does not store the confidential information involved for all applications on all devices. For example, the application provides an encryption key pair used to protect the transmission of the authorization token. The network infrastructure responses by providing an instrument that the application needs to present in the authorization token. When the application wants to communicate through the network infrastructure, the application will present this provided instrument including information needed by the Transport Layer Security (TLS) proxy to decrypt the authorization token.

After the trustworthiness of the application 212 and the endpoint 210 has been established, when the application 212 needs to communicate to services 232 through the enterprise network infrastructure 220, the trusted endpoint 210 and the enterprise network infrastructure 220 will conduct path negotiation to determine the traffic inspection method for different traffic flows. In some examples, the path negotiation is conducted between the application 212 and security functions of the enterprise network infrastructure 220.

Traffic paths can be negotiated on a per application and/or a per transaction basis according to the attestation information and based on a nature of the transaction provided by the application with embedded attestation. In some embodiments, the traffic path can be negotiated every time the application establishes a new session through the Transport Layer Security (TLS) proxy of the enterprise security infrastructure. For example, traffic flows can be diverged along different paths such as a trusted path, a Metadata policy enforced path, and an authorized proxy path.

Figure 3A:
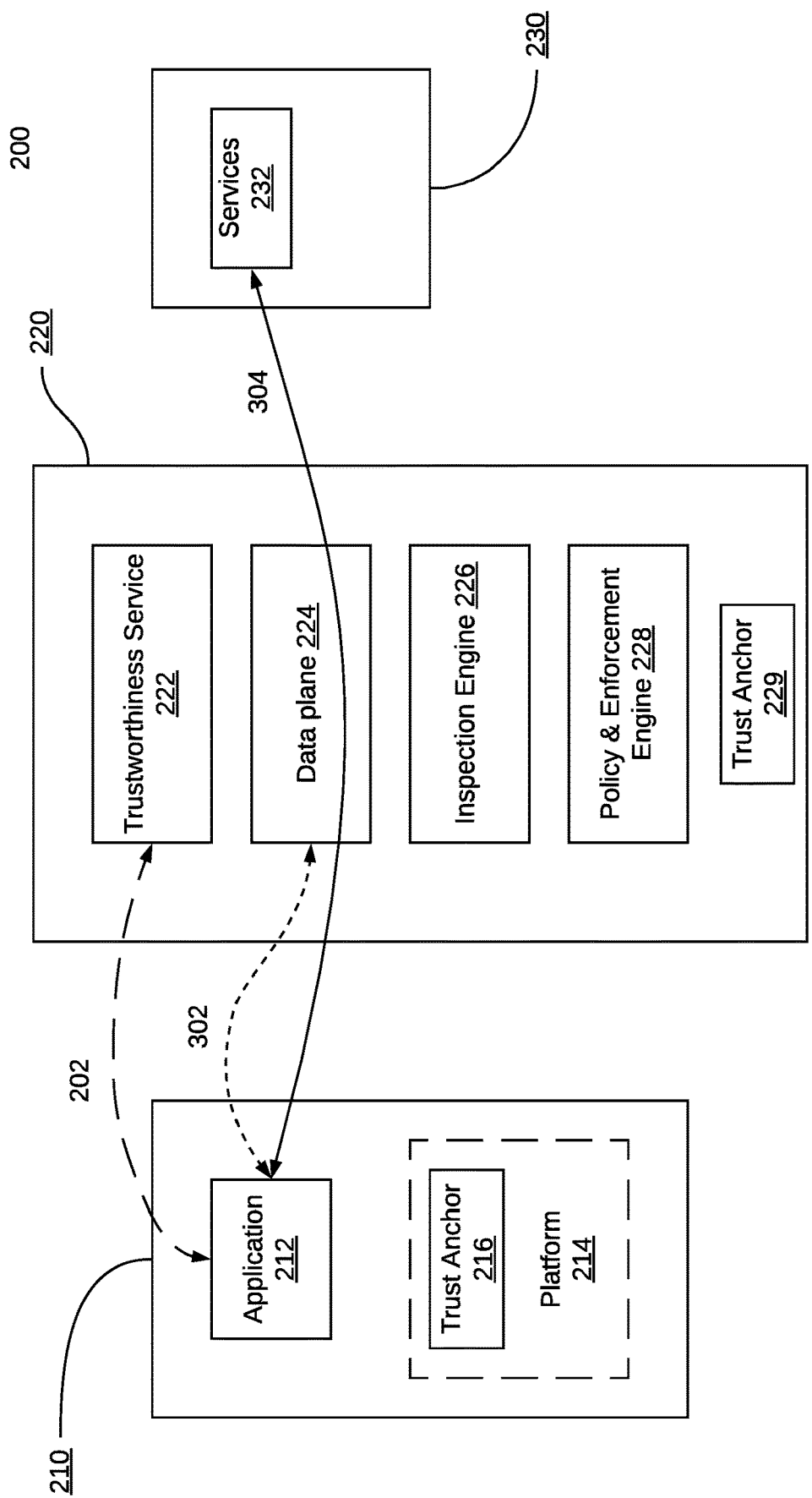
FIG. 3A illustrates an example trusted path traffic inspection embodiment in accordance with some aspects of the present technology.
Figure 3B:
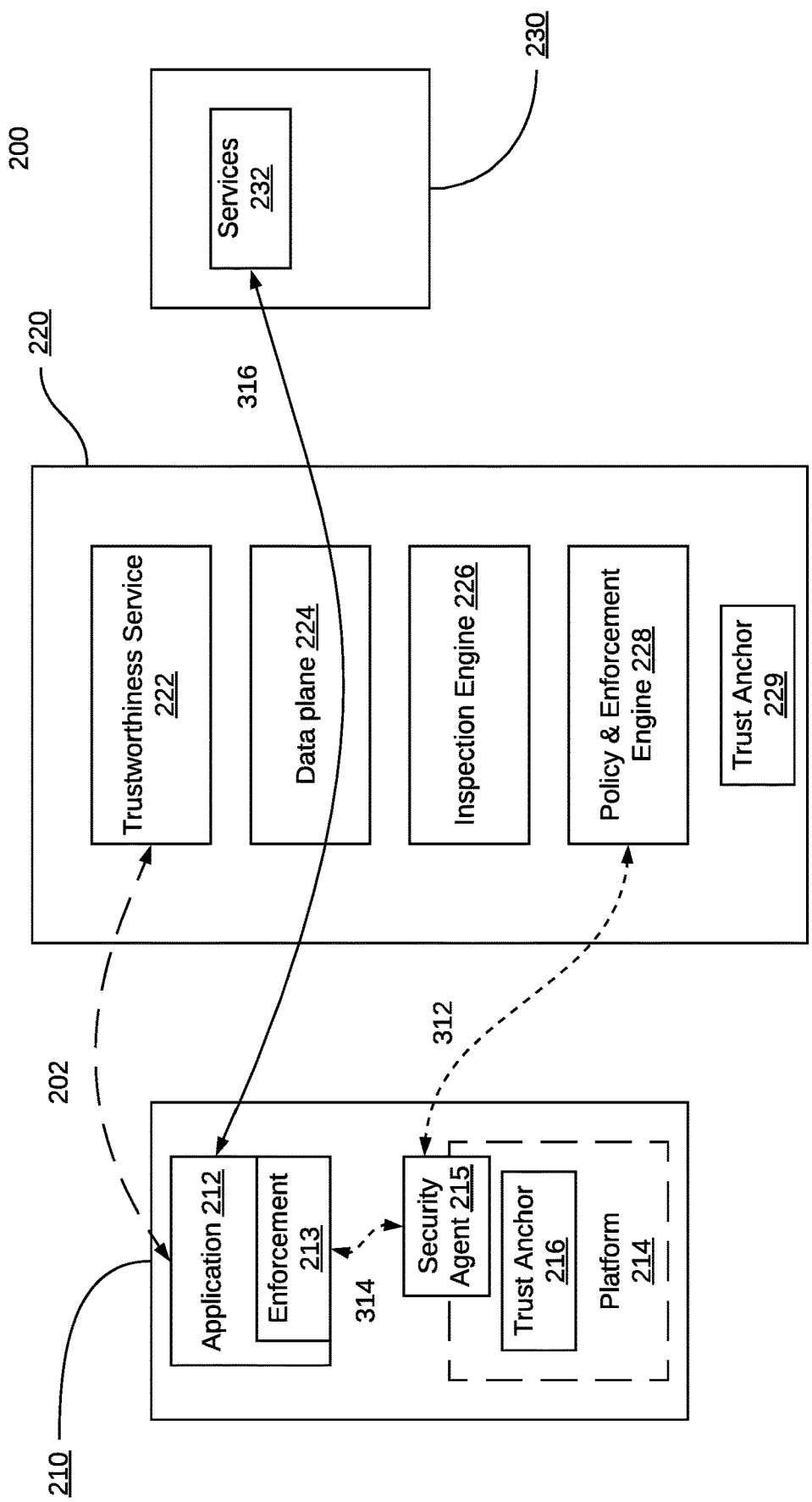
FIG. 3B illustrates an example Metadata policy query traffic inspection embodiment in accordance with some aspects of the present technology.
Figure 3C:
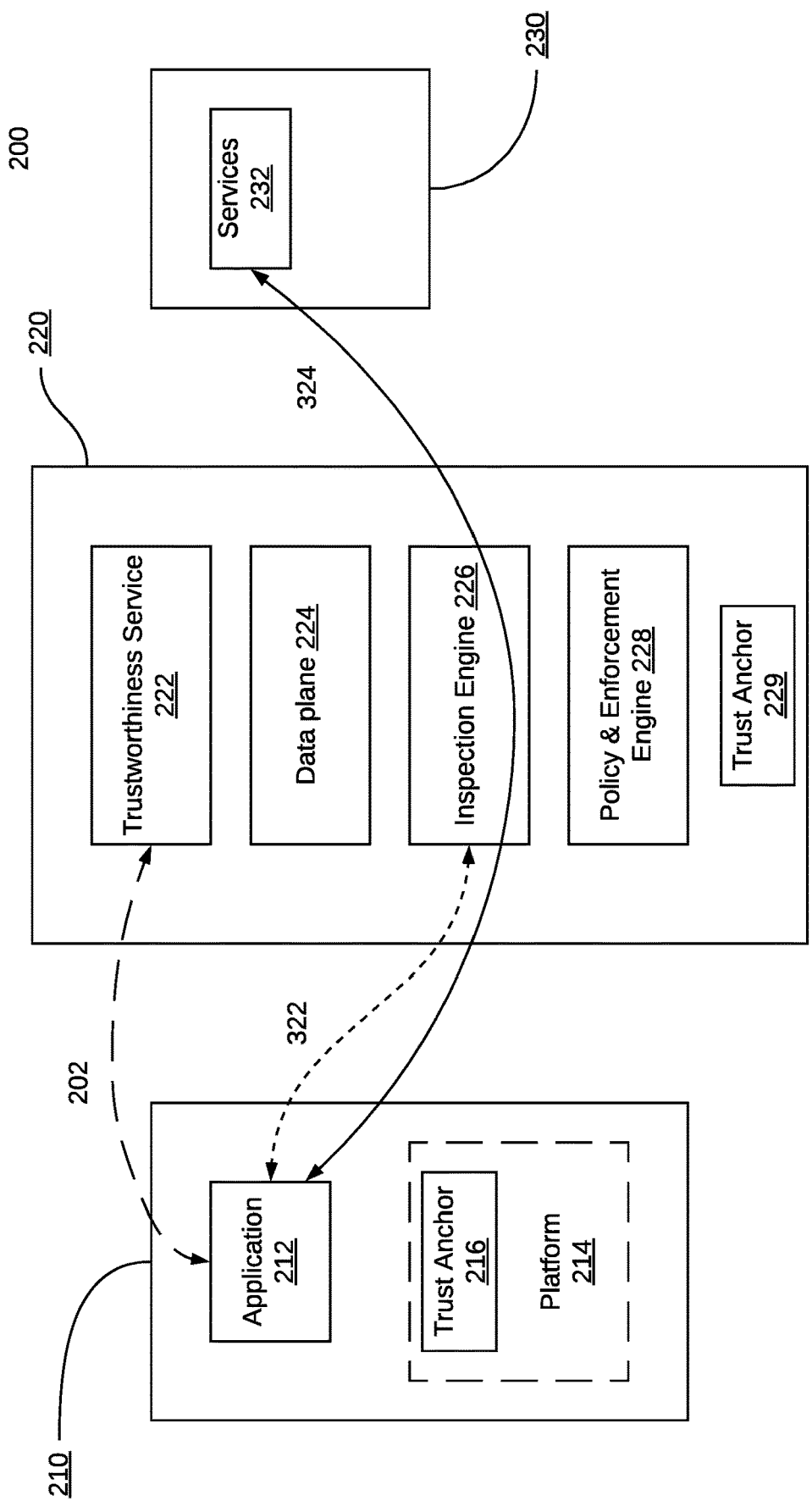
FIG. 3C illustrates an example authorized proxy negotiation traffic inspection embodiment in accordance with some aspects of the present technology.

FIG. 3A illustrates an example trusted path traffic inspection method. In some examples, the trusted path traffic inspection method is chosen for simple data transactions, so that the data from the trusted application 212 on the trusted endpoint 210 may traverse the network with minimal or no inspection applied to the traffic flow. Examples of such simple data transactions include voice calls, or video streaming. Under such examples, after the trusted path negotiation 302 has been completed, the trusted data flow 304 can traverse the whole network through the data plane 224 to the services 232 with no inspection.

FIG. 3B illustrates an example Metadata policy query traffic inspection method. In some examples, the Metadata policy query traffic inspection method is chosen for data that is confidential and requires no inspection on its content whereas its Metadata can be disclosed. Examples of such data include social security number, credit card number, or other confidential information. The extracted Metadata includes universal resource locator (URL), or other selected data fields such as data loss prevention (DLP) fields. After the enterprise network infrastructure 220 sends a query requiring more information, the application 212 extracts the Metadata and send it to the policy and enforcement engine 228 of the enterprise security infrastructure 220 for the negotiation through channel 312.

In some examples, the enforcement function 213 of the application 212 can transfer the data's Metadata to the security agent 215 of the platform 214 (314). The enforcement function 213 can also be implemented with the security agent 215. Then, the security agent 215 can gather such Metadata from all the applications 212 on the endpoint 210, and conduct the path negotiation on behalf of all of the applications 212 with the policy and enforcement engine 228. The extracted Metadata can be trusted by security functions of the enterprise security infrastructure 220 receiving it along with the embedded attestation. Once the application 212 has been determined as trustworthy, a side channel, such as channel 312, may facilitate additional security and application information to a policy and enforcement engine 228. For example, telemetry, endpoint/policy configuration information, or Domain Name System (DNS) domains may be exchanged between the security agent 215 and the policy and enforcement engine 228 through the side channel 312.

After the negotiation, the policy and enforcement engine 228 will determine an inspection method for the traffic flow of the corresponding data. Such a determination is based on the enterprise security infrastructure 220's specific security policy for the inspection of the specific type of traffic flow that is being transferred. For example, the traffic flow can traverse the whole network through the data plane 224 to the services 232 with minimal or no inspection (316), based on the corresponding security policy chosen by the enterprise security infrastructure 220.

FIG. 3C illustrates an example authorized proxy negotiation traffic inspection method. In some examples, the authorized proxy negotiation traffic inspection method is chosen for data that requires inspection on its content, but the inspection is only done when authorized from the application 212. The application 212 and the inspection engine 226 first negotiate such an authorized proxy negotiation traffic inspection method for the data (322), the application 212 then transfer the data through the inspection engine 226 for inspection (324). But the inspection can only be done with the authorization from the application 212 through some mechanisms. An example of such mechanism is transferring a decryption key for only the session of the traffic flow that has been authorized by the application 212. Such decrypted inspection is decided and conducted on a session by session basis. Individual decryption session keys can be shared with security functions of the enterprise security infrastructure 220 based on, for example, the embedded attestation and telemetric and related information provided via an additional channel.

This example method of collaborative security for application layer encryption provides several improvements over the current security functions of network security infrastructure. First, it does not slow down the traffic for simple data transactions with the trusted path traffic inspection method. Second, it does not modify the data flow when requested by the application, with the trusted path traffic inspection method and the Metadata policy query traffic inspection method. Third, the application has control over which portion of the data could be inspected with the authorized proxy negotiation traffic inspection method. Specifically, the applications decide which portion of the data can be intercepted, decrypted, and inspected by the network security infrastructure. Moreover, the applications can choose to avoid certain portion of data being modified during inspection, which is the byproduct of the current proxy security method.

Although the system shown in FIG. 4 is one specific network device or endpoint of the present disclosure, it is by no means the only network device architecture on which the concepts herein can be implemented. For example, an architecture having a single processor 408 that handles communications as well as routing computations, etc., can be used. Further, other types of interfaces 402 and media could also be used with the network device 400.

Regardless of the network device's configuration, it may employ a CPU 404 and one or more memories or memory modules (including memory 406) configured to store program instructions for the general-purpose network operations and mechanisms for functions described herein to be executed by processor 408. The program instructions may control the operation of an operating system and/or one or more applications, for example. The memory or memories may also be configured to store tables such as mobility binding, registration, and association tables, etc. Memory 406 could also hold various software containers and virtualized execution environments and data.

The network device 400 can also include an application-specific integrated circuit (ASIC), which can be configured to perform routing, switching, and/or other operations. The ASIC can communicate with other components in the network device 400 via the connection 410, to exchange data and signals and coordinate various types of operations by the network device 400, such as routing, switching, and/or data storage operations, for example.

Figure 5:
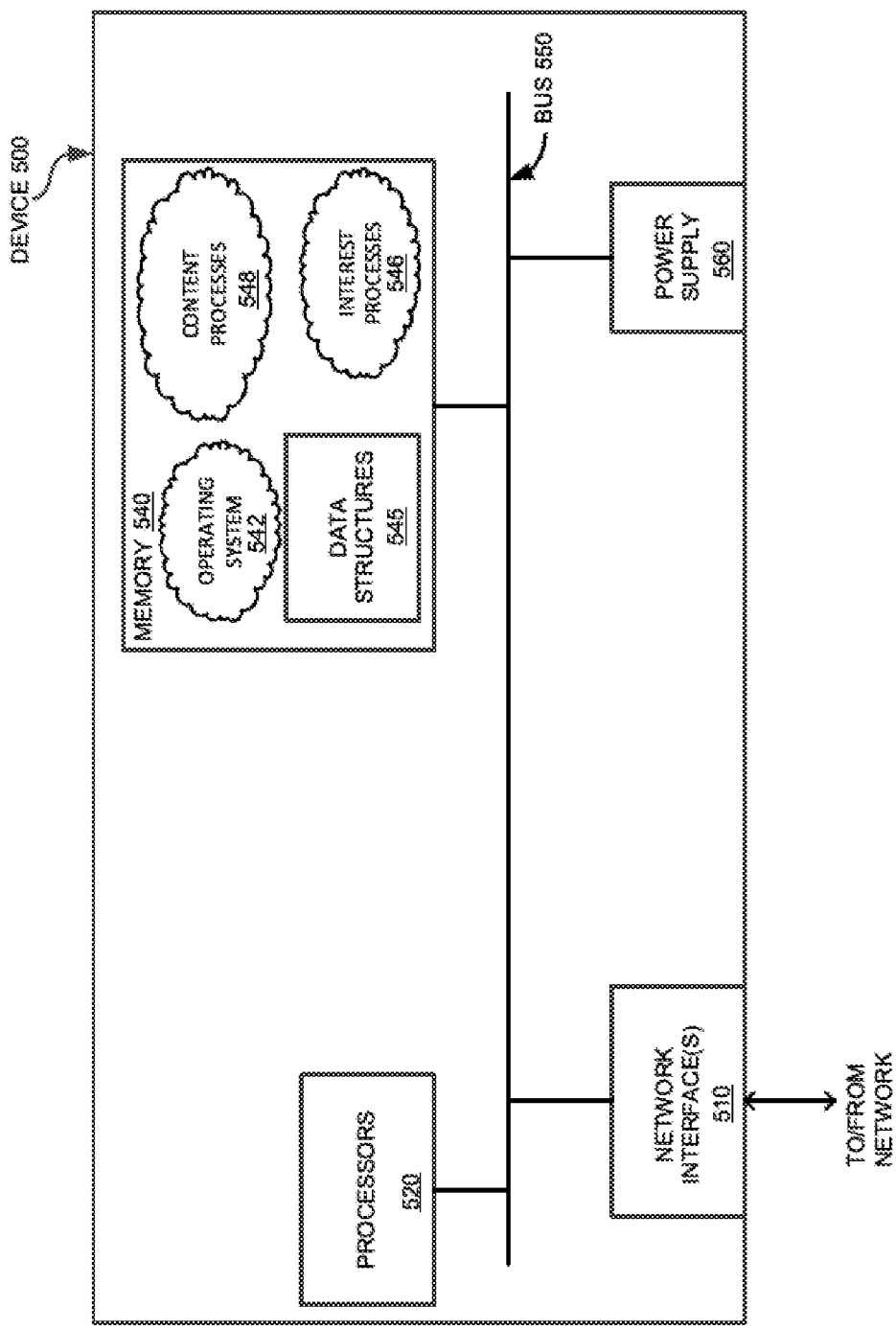
FIG. 5 illustrates an example computing device, according to various embodiments of the subject technology.

FIG. 5 is a schematic block diagram of an example computing device 500 that may be used with one or more embodiments described herein e.g., as any of the discussed above or to perform any of the methods discussed above, and particularly as specific devices as described further below. The device may comprise one or more network interfaces 510 (e.g., wired, wireless, etc.), at least one processor 520, and a memory 540 interconnected by a system bus 550, as well as a power supply 560 (e.g., battery, plug-in, etc.).

Network interface(s) 510 contain the mechanical, electrical, and signaling circuitry for communicating data over links coupled to a network, e.g., providing a data connection between device 500 and the data network, such as the Internet. The network interfaces may be configured to transmit and/or receive data using a variety of different communication protocols. For example, interfaces 510 may include wired transceivers, wireless transceivers, cellular transceivers, or the like, each to allow device 500 to communicate information to and from a remote computing device or server over an appropriate network. The same network interfaces 510 also allow communities of multiple devices 500 to interconnect among themselves, either peer-to-peer, or up and down a hierarchy. Note, further, that the nodes may have two different types of network connections 510, e.g., wireless and wired/physical connections, and that the view herein is merely for illustration. Also, while the network interface 510 is shown separately from power supply 560, for devices using Power Line Communication (PLC) or Power over Ethernet (PoE), the network interface 510 may communicate through the power supply 560, or may be an integral component of the power supply.

Memory 540 comprises a plurality of storage locations that are addressable by the processor 520 and the network interfaces 510 for storing software programs and data structures associated with the embodiments described herein. The processor 520 may comprise hardware elements or hardware logic adapted to execute the software programs and manipulate the data structures 545. An operating system 542, portions of which are typically resident in memory 540 and executed by the processor, functionally organizes the device by, among other things, invoking operations in support of software processes and/or services executing on the device. These software processes and/or services may comprise one or more interest processes 546 which, on certain devices, may be used by an illustrative content process 548, as described herein. Notably, interest processes 546 may be stored and/or retrieved for storage by processor(s) 520 via, for example, network interface(s) 510 or other processes according to the configuration of device 500.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A non-transitory computer readable medium comprising instructions stored thereon, the instructions effective to cause at least one processor to:
 establish trustworthiness of an application installed on an endpoint, wherein the established trustworthiness is sufficient for an enterprise security infrastructure to treat the application installed on the endpoint and the endpoint as a trusted application and a trusted endpoint;

negotiate with the trusted endpoint to determine a security policy, wherein the security policy comprises a traffic inspection method for traffic flows originating at the trusted application that is destined for a service, wherein the traffic inspection method is determined based on at least the trusted application, and the service;

instruct the trusted application of the determined traffic inspection method; and transmit a traffic flow originating at the trusted application and destined for the service;

inspect the traffic flow in accordance with the traffic inspection method in response to the traffic inspection method specifying inspection of traffic flow.

2. The non-transitory computer readable medium of claim 1 wherein during the negotiation with the trusted endpoint, the trusted application provides a characterization of a transaction with the service, wherein the negotiation further comprises an extension in a Transport Layer Security (TLS) protocol communication.

3. The non-transitory computer readable medium of claim 1 wherein the determined traffic inspection method is a trusted path traffic inspection method specifying traffic flow to proceed without inspection, and wherein the instructions are further effective to cause at least one processor to:

instruct the enterprise security infrastructure to allow the traffic flow to pass without inspection.

4. The non-transitory computer readable medium of claim 3 wherein establish trustworthiness further comprises receiving an attestation regarding the application, and the received attestation regarding the application is from the application on the trusted endpoint, wherein the attestation is embedded in a Transport Layer Security (TLS) protocol negotiation between the application and a trustworthiness service.

5. The non-transitory computer readable medium of claim 1 wherein the determined traffic inspection method is a metadata policy query traffic inspection method, wherein the instructions are further effective to cause at least one processor to:

receive, by a policy enforcement engine, metadata extracted by a security agent on the trusted device from the trusted application;

transfer the traffic flow, by the policy enforcement engine, according to a policy based on the metadata.

6. The non-transitory computer readable medium of claim 1 wherein the determined traffic inspection method is a proxy negotiation traffic inspection method, wherein the instructions are further effective to cause at least one processor to:

negotiate with the trusted application a proxy function, wherein the negotiated proxy function further comprises agreeing on an encryption key for decryption of portion of the data of the traffic flow;

apply the proxy function to decrypt a portion of the data in the traffic flow for inspection; and transfer the traffic flow according to a policy based on the inspection of the portion of the data in the traffic flow.

7. The non-transitory computer readable medium of claim 1 wherein the determined traffic inspection method is applicable for a single session of a transfer of data.

8. The non-transitory computer readable medium of claim 7, wherein the instructions are further effective to cause at least one processor to:

receive a communication to initiate a second session between the trusted device and the service;

again negotiate with the trusted endpoint to determine a traffic inspection method for traffic flows originating at the trusted application that is destined for the service, without establishing the trustworthiness.

9. The non-transitory computer readable medium of claim 1 wherein establish trustworthiness further comprises receiving an attestation regarding the application, and the received attestation regarding the application is from the trusted endpoint and includes a security posture from a trust anchor of the trusted endpoint.

10. The non-transitory computer readable medium of claim 1 further comprises:

after establishing trustworthiness, sharing information of the trusted application and the trusted endpoint across a network infrastructure, providing, by the enterprise security infrastructure, an authorization token to the trusted application and the trusted endpoint; and communicating, between the trusted application and the network infrastructure, by validating the authorization token.

11. A method comprising:

establishing trustworthiness of an application installed on a endpoint, wherein the established trustworthiness is sufficient for an enterprise security infrastructure to treat the application installed on the endpoint and the endpoint as a trusted application and a trusted endpoint;

negotiating with the trusted endpoint to determine a traffic inspection method for traffic flows originating at the trusted application that is destined for a service, wherein the traffic inspection method is determined based on at least the trusted application, and the service and instructing the trusted application of the determined traffic inspection method; and transmit a traffic flow originating at the trusted application and destined for the service;

inspect the traffic flow in accordance with the traffic inspection method in response to the traffic inspection method specifying inspection of traffic flow.

12. The method of claim 11 wherein during the negotiating with the trusted endpoint, the trusted application provides a characterization of a transaction with the service.

13. The method of claim 11, wherein when the determined traffic inspection method is a trusted path traffic inspection method specifying traffic flow to proceed without inspection, the method of claim 11 further comprises:

instructing the enterprise security infrastructure to allow the traffic flow to pass without inspection.

14. The method of claim 13 wherein establishing trustworthiness further comprises receiving an attestation regarding the application, and the received attestation regarding the application is from the application on the trusted endpoint, wherein the attestation is embedded in a Transport Layer Security (TLS) protocol negotiation between the application and a trustworthiness service.

15. The method of claim 11 wherein when the determined traffic inspection method is a metadata policy query traffic inspection method, the method of claim 11 further comprises:

receiving, by a policy enforcement engine, metadata extracted by a security agent on the trusted device from the trusted application;

transferring the traffic flow, by the policy enforcement engine, according to a policy based on the metadata.

16. The method of claim 11 wherein when the determined traffic inspection method is a proxy negotiation traffic inspection method, the method of claim 11 further comprises:
negotiating with the trusted application a proxy function, wherein the negotiated proxy function further comprises agreeing on an encryption key for decryption of portion of the data of the traffic flow;
applying the proxy function to decrypt a portion of the data in the traffic flow for inspection; and
transferring the traffic flow according to a policy based on the inspection of the portion of the data in the traffic flow.

17. The method of claim 11 wherein the determined traffic inspection method is applicable for a single session of a transfer of data.

18. The method of claim 17 wherein establishing trustworthiness further comprises binding a Canary Stamp for the endpoint and a signing voucher for the application together.

19. The method of claim 11 wherein establishing trustworthiness further comprises receiving an attestation regarding the application, and the received attestation regarding the application is from the trusted endpoint and includes a security posture from a trust anchor of the trusted endpoint.

20. A system, comprising:
at least one processor;
a non-transitory computer readable medium comprising instructions stored thereon, the instructions effective to cause at least one processor to:
establish trustworthiness of an application installed on an endpoint, wherein the established trustworthiness is sufficient for an enterprise security infrastructure to treat the application installed on the endpoint and the endpoint as a trusted application and a trusted endpoint;
negotiate with the trusted endpoint to determine a security policy, wherein the security policy comprises a traffic inspection method for traffic flows originating at the trusted application that is destined for a service, wherein the traffic inspection method is determined based on at least the trusted application, and the service;
instruct the trusted application of the determined traffic inspection method; and
transmit a traffic flow originating at the trusted application and destined for the service;
inspect the traffic flow in accordance with the traffic inspection method in response to the traffic inspection method specifying inspection of traffic flow.

* * * * *